United States Patent [19]

Chuang et al.

[11] 3,859,513

[45] Jan. 7, 1975

[54] SWITCHING AND DIGITAL SYSTEM

[75] Inventors: Henry Ying Huang Chuang, Creve Coeur; Santanu Das, University City, both of Mo.

[73] Assignee: The Washington University, St. Louis, Mo.

[22] Filed: Feb. 28, 1973

[21] Appl. No.: 336,520

[52] U.S. Cl. .................... 235/153 AE, 235/153 BG

[51] Int. Cl. ............................................ G06f 11/00

[58] Field of Search ............... 235/153 BG, 153 AE; 340/146.1 R, 146.1 BE, 172.5; 307/204, 209

[56] References Cited

UNITED STATES PATENTS

| | | | |
|---|---|---|---|
| 3,449,716 | 6/1969 | Brothman et al. | 340/146.1 R |
| 3,543,048 | 11/1970 | Klaschka | 307/204 |
| 3,634,665 | 1/1972 | Carter et al. | 235/153 BG |

OTHER PUBLICATIONS

Sellers, et al., Error Detecting Logic for Digital Computers, McGraw-Hill Book Company, 1968, pp. 143–149.

*Primary Examiner*—Charles E. Atkinson
*Attorney, Agent, or Firm*—Stuart N. Senniger

[57] ABSTRACT

An increased reliability switching or digital system comprising at least two identical logic networks and restorer means. Each of the logic networks has an output providing three distinctly different types of output signals, viz., correct, safe and incorrect so that there are two possible levels of failure, one being a safe level and the other being an incorrect level. The restorer means has inputs connected to the logic network outputs and has a single output providing three distinctly different types of output signals, the first of which is correct, the second of which is safe, and the third being incorrect. The restorer means provides a correct output signal for so long as more of the logic networks have correct output signals than have incorrect output signals no matter how many networks might have a safe output signal. Further, the restorer means provides a safe output signal if as many logic networks have a correct output signal as have an incorrect output signal. Additionally disclosed is apparatus for interfacing double-rail and single-rail logic components.

19 Claims, 20 Drawing Figures

SWITCHING AND DIGITAL SYSTEM

BACKGROUND OF THE INVENTION

This invention relates to switching and digital systems and more particularly to improved or increased reliability switching and digital systems.

As our society becomes increasingly more dependent on machines for automation and computation, it is vital that these machines be highly reliable. In certain areas of application, incorrect outputs could cause catastrophic results. To avoid this, one must have a system with high correct output reliability and an even higher safe output reliability. Further, the system should be easily amenable to the use of spares so that one can use replacement (dynamic redundancy) to restore the fault-restoration capability of the system in case one of the active units fails.

In the past 15 years, various techniques and strategies have evolved for increasing the reliability of digital systems. All of these have one fundamental principle in common which is to increase the reliability by fault-masking. The first of these, proposed by Moore and Shannon ("Reliable Circuits Using Less Reliable Relays," *Journal of the Franklin Institute*, Vol. 262, pp. 181–208, Sept. 1956; pp. 281–297, Oct. 1956), demonstrated the feasibility of using unreliable or "crummy" relays to synthesize reliable circuits. In that scheme, each single relay was to be replaced by a relay combination designed to reduce the probability of failure to some predetermined level which can always be attained by utilizing a proper series-parallel combination. Although that technique relied on the ability of relays to pass current in either direction, Teoste utilized this scheme to improve the reliability of a flip-flop ("Digital Circuit Redundancy," *IEEE Trans. on Reliability*, Vol. R-13, pp. 42–61, June, 1974).

The second and probably the most notable scheme to date is proposed by Von Neuman ("Probabilistic Logics and the Synthesis of Reliable Organisms from Unreliable Components," *Annals of Mathematical Studies*, No. 34, pp. 43–98, Princeton University Press, Princeton, New Jersey, 1956), who used multiple copies of logic circuits together with majority organs or "voters" to mask failures. The usual adaptation of that scheme uses a triplicated logic circuit with two-out-of-three voters placed at their outputs and this is known as triple modular redundancy (TMR). When N-copies are used (N being an odd number greater than 3), it is called N-modular redundancy (NMR).

Another redundancy technique known as "quadded logic" was developed by Tryon ("Quadded Logic," *Redundancy Techniques for Computing Systems*, Wilcox and Mann, eds., pp. 205–228, Spartan Books, Washington, D.C., 1962), who used quadruplication in each stage of a network. Failure restoration was accomplished by mixing the four output signals pairwise at the inputs of the next stage. Thus the failure was corrected, just downstream of the stage at which a failure occurred, with the help of correct signals from the neighboring gates. Tyron's redundancy scheme was generalized by Pierce into "interwoven logic" ("Interwoven Logic," *Journal of Franklin Institute*, Vol. 277, pp. 55–85, 1964). As in the quadded logic, Pierce's idea was to mix correct signals with incorrect ones in such a way as to produce a net correct output. However, each gate did not receive all signals from the previous stage.

Watanabe and Urano ("Synthesis of Fail-Safe Logical Systems," *Tech. Report No.* 54 (in English), Research Laboratory, Kokusai Denshin Denwa Co., Ltd., Tokyo, May, 1969) and Mine and Koga ("Basic Properties and a Construction Method for Fail-Safe Logical Systems," *IEEE Trans. on Electronic Computers*, Vol. E.C.–16, No. 3, pp. 282–289, June, 1967) took a radically different approach and introduced the idea of fail-safe logic. Their premise was that the effect of an incorrect "zero" could be different from that due to an incorrect "one" or vice versa. With this in mind, they developed methods of realizing fail-safe logic systems. Watanabe and Urano and later Takaoka ("Algebraic Theory of Automata and its Application to Fail-Safe Systems," Ph.D. dissertation, Dep. Appl. Math and Physics, Kyoto University, Kyoto, Japan, Dec. 1970) extended the fail-safe concept to N-fail-safe (or $\phi$-fail-safe) logic in which 0 and 1 are always the correct values and N (or $\phi$) is the incorrect but safe value.

Finally, Finkelstein ("An Investigation into the Extension of Redundancy Techniques," Co-ordinated Sciences Laboratory, University of Illinois, Report R–455, Feb., 1970) recently proposed a redundancy technique based on "collector-dotting" (wired-OR or wired-AND feature) called "dotted logic." His approach is similar to "interwoven logic" of Pierce with the exception that he used only NAND and NOR primitives coupled with "dotting" in each stage.

Moore and Shannon's technique (and Toeste's extension) is suitable for relays or components with bidirectional characteristics, and therefore is not practical with the present state of the art. Although TMR is practical and useful in many applications, its relatively low reliability necessitates the use of "sparing." However, switching spares in and out is relatively difficult for TMR and so also is failure detection, inasmuch as the basic modules do not have failure indication capabilities, as compared to N-fail-safe logic, for example. "Quadding" has better reliability for single error correction, but it is very difficult to implement and debug. "Interwoven logic," though less costly than "quadded logic," suffers from the same drawbacks. "Dotted logic" is superior to TMR or quadded logic in several aspects. It, however, requires the use of components whose output can be dotted such as DTL (diode-transistor logic). Sparing is even more difficult in dotted logic, interwoven logic and quadded logic than in TMR. Fail-safe logic and N-fail-safe logic depend on the availability of asymmetrical components (components which will always fail in one direction). Furthermore, they are not capable of self-restoration.

An eminent disadvantage common to all these prior methods of reliability improvement is that they all have only one level of reliability.

SUMMARY OF THE INVENTION

Among the several objects of this invention may be noted the provision of an improved reliability switching and digital system which, in the event of failure to provide a correct output, has a higher probability of providing a safe output than an incorrect output; the provision of a system as described herein which has a high correct output reliability and an even higher safe output reliability, and which is easily amenable to the use of spares to effect fault-restoration capability of the system in the event an active unit should fail; the provision of such a system which has two levels of failure, one of which is a safe or restoration level and the other of which is a catastrophic level, and the failure probabilities of these two levels can be adjusted relative to each other thereby providing a high degree of flexibility; the provision of such systems which may utilize a multiple number of active copies and can be operated with any lesser number of copies without having to change the restoration means utilized, thereby providing an advantageous and improved degradability; the provision of systems of the type described which may utilize spares to obtain hybrid redundancy and which will indicate the existence of the failure of a unit, and initiate correction measures to effect self-restoration; the provision of such a system in which any number of unidirectional failures in the components will not drive the system to failure and in which no single failure in the restorer means will result in an unsafe or incorrect system output; the provision of an improved reliability switching and logic system which may employ fail-safe components and utilize single- and double-rail operation; and the provision for fail-safe conversion of a double-rail signal to a single-rail signal. Other objects and features will be in part apparent and in part pointed out hereinafter.

Briefly, the increased reliability switching or digital system of this invention comprises at least two identical logic networks and a restorer means. Each of the logic networks has an output providing three distinctly different types of output signals, these being correct, safe and incorrect, whereby there are two possible levels of failure, one being a safe level and the other being an incorrect level. The restorer means has inputs connected to the logic network outputs and has a single output providing three distinctly different types of output signals, the first of which is correct, the second of which is safe, and the third being incorrect. The restorer means provides a correct output signal for so long as more of the logic networks have correct output signals than have incorrect output signals no matter how many networks might have a safe output signal. Further, the restorer means provides a safe output signal if as many logic networks have a correct output signal as have an incorrect output signal. The system may utilize either single- or double-rail input and output signals and another aspect of the invention provides fail-safe apparatus for converting a double-rail signal to a single-rail signal.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
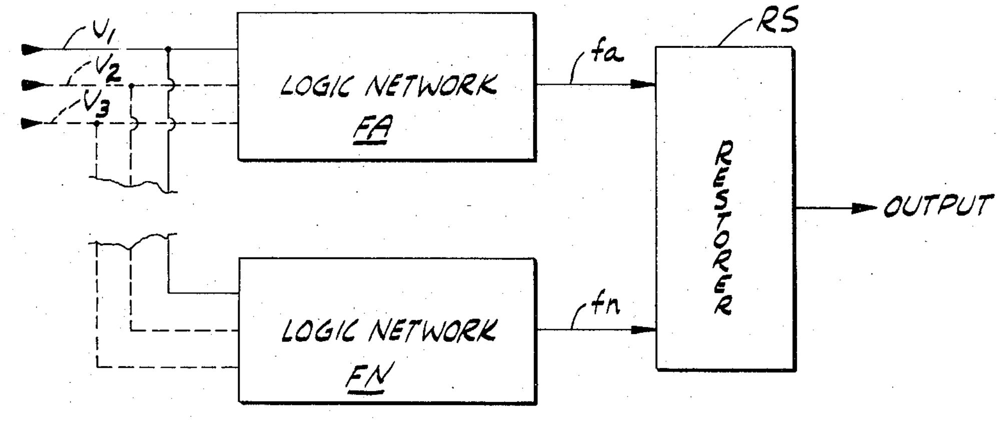
FIG. 1 is a block diagram of an improved reliability switching and digital system of the present invention utilizing multiple copies of identical logic and fault restoration means.

Referring now more particularly to FIG. 1, a system of the invention includes at least two identical logic networks FA–FN having the usual input signal or signals representative of variables constituting the input information fed to the typical logic networks FA–FN. Networks FA–FN have outputs fa–fn connected to inputs of a restorer RS. The individual logic networks or blocks or copies each have two levels of failure. In the first level, referred to as the "safe output" level, the output is not correct but its value is something different from normal operating values of the output of the logic blocks. In the second level of failure, the output is "wrong" and "unsafe," and the value it takes up is one of the normal operating values, but is not the correct one. Restorer RS functions to give the correct output as long as there are more copies having correct outputs than those having incorrect outputs, no matter how many copies have safe outputs. In case there are as many copies FA–FN with correct outputs as with incorrect outputs (again no matter how many other copies have a safe output), then the restorer output is a safe value. To further elucidate the principle of this invention, the restorer function for a three-copy system is shown below, R, W, and S standing for right, wrong and safe type output signals, respectively ("No. of Combinations" means the number of ways copies FA–FC can have a particular set of outputs):

| FA | FB | FC | OUTPUT (RESTORER) | No. of Combinations |
|---|---|---|---|---|
| S | S | R | R | 3 |
| S | R | R | R | 3 |
| R | R | R | R | 1 |
| W | R | R | R | 3 |
| S | S | S | S | 1 |
| W | S | R | S | 6 |
| W | W | S | W | 3 |
| W | S | S | W | 3 |
| W | W | W | W | 1 |
| W | W | R | W | 3 |

Here each of the three logic network copies FA, FB and FC can have three distinctly different type outputs or output states, R (right or correct), W (wrong or incorrect), and S (safe). In each logic block, the probability of getting the safe output S can be assumed to be higher than that of having an incorrect output. In other words, more internal failures are required to result in an incorrect output than in a safe output. This safe output S can be used to indicate the necessity of outside intervention and, depending on the application, provisions could be made for either manual or automatic corrective measures (say, replacement of the faulty unit).

While the input variables $V_1$–$V_3$, network outputs *fa–fn* and the restorer output are all represented by single lines, they may be single-rail or double-rail.

Each individual logic network copy in FIG. 1 may be made of such logic primitives as will produce safe output S in case of failure, and failures in the primitives would be manifested at the outputs of the copies by driving them to S. However, most of the common logical components do not exhibit such failure characteristics and most presently available logical components are two-valued. But using available electronic technology, N-fail-safe logic, referred to above, may be employed for the individual copies of logic shown in FIG. 1.

Figure 2A:
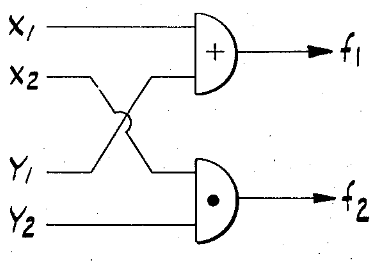
FIGS. 2A, 2B and 2C are logic diagrams respectively illustrating N-fail-safe primitives OR, NOT and AND useful in the practice of this invention.
Figure 2B:
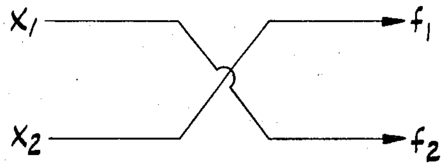
Figure 2C:
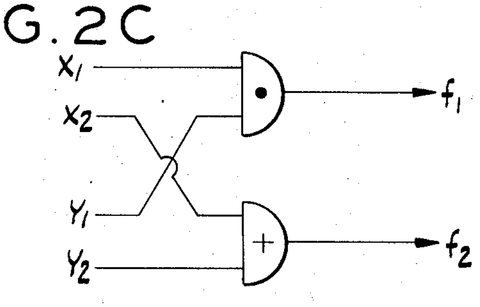

Takaoka, supra, and Takaoka and Mine ("N-fail-safe Logical Systems," *IEEE Trans. Comput.*, Vol. C–20, pp. 536–542, May, 1971) have discussed mathematical properties of N-fail-safe logic and have also described methods of realizing N-fail-safe functions. Complementary duplicate coding technique is generally used for realizing N-fail-safe functions. By this technique, both the inputs and outputs are coded, each variable being represented by two lines. Under normal conditions, the output will be (0, 1) or (1, 0), but in case of failure ideally the output will be either (1, 1) or (0, 0). FIGS. 2A–2C show N-fail-safe OR, NOT, and AND, respectively, where the variable x is coded by the lines ($x_1$, $x_2$) and y by ($y_1$, $y_2$). Truth tables for N-fail-safe OR and AND are given below:

| VARIABLE x | y | $f(x,y)=x+y$ | $f(x,y)=x\cdot y$ |
|---|---|---|---|
| 0 | 0 | 0 | 0 |
| 0 | 1 | 1 | 0 |
| 1 | 0 | 1 | 0 |
| 1 | 1 | 1 | 1 |
| 0 | N | N | 0 |
| N | 0 | N | 0 |
| 1 | N | 1 | N |
| N | 1 | 1 | N |
| *N | N | N | N |

*For this combination, the two N's have to be both (0,0) or both (1,1); otherwise the output would be incorrect.

If no more than a single input line or logical element fails at one time, the output will either be correct or will fail to a safe value N. The output will also have a safe value even if both logical elements fail in the same direction, i.e., if both get stuck at 1 or 0. These logic primitives can be utilized to realize the N-fail-safe function of any Boolean function. An additional advantage of an N-fail-safe logical network is that a failure in any of the primitives tends to propagate to the output producing an N output, immediately indicating that there is a failure somewhere inside. This N output can be used to indicate the safe state S, which may be used to initiate replacement or other corrective measures.

Figure 3:
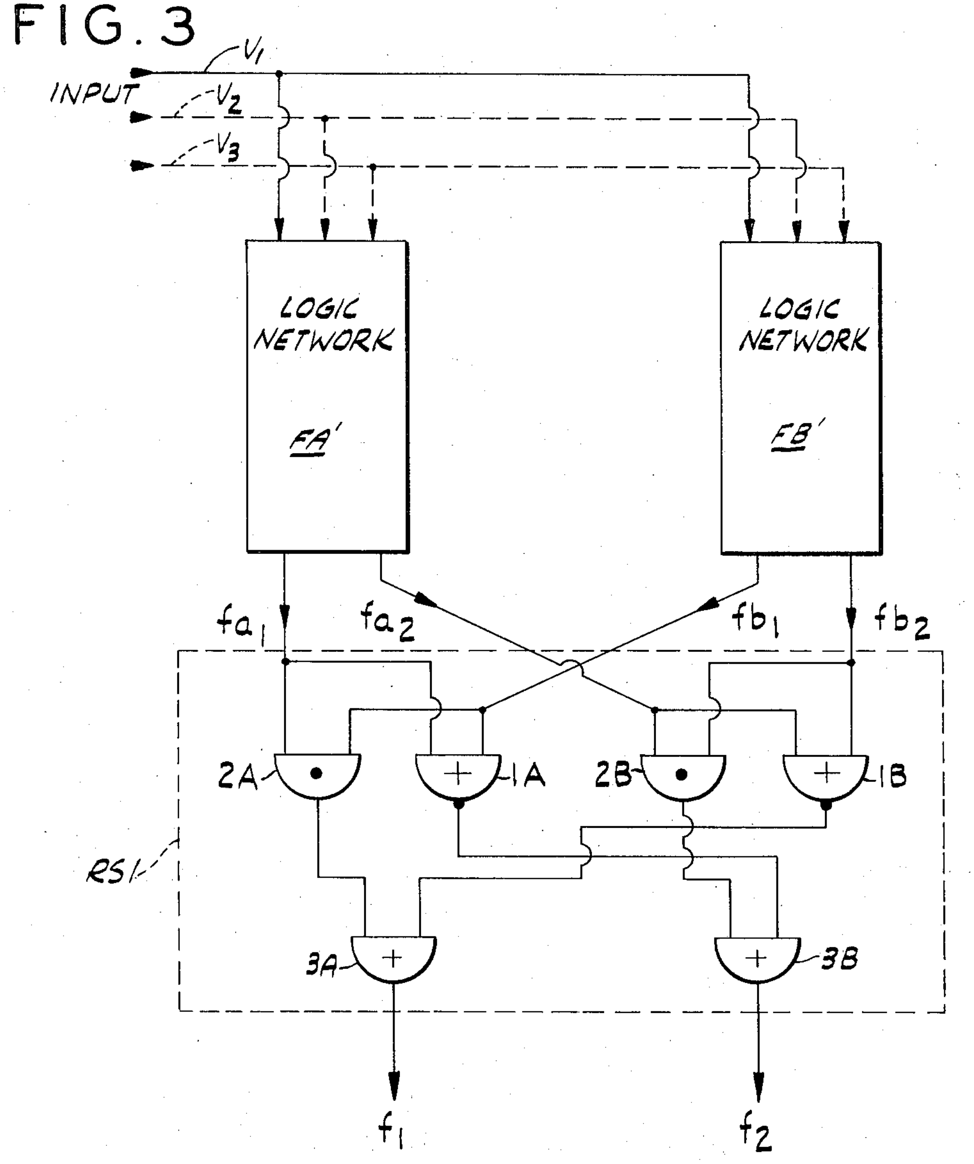
FIG. 3 is a logic diagram illustrating fault restoration using two copies of N-fail-safe logic networks.

FIG. 3 illustrates by logic diagram a specific system of this invention using two identical network copies FA′ and FB′ of N-fail-safe logic realizing a function f of variables $V_1$–$V_3$. The two-rail output signals $fa_1$, $fa_2$ and $fb_1$, $fb_2$ of the identical network copies FA′ and FB′ are connected to the inputs of a restorer means RS1 which includes two NOR gates 1A and 1B, a pair of AND gates 2A and 2B, and a pair of OR gates 3A and 3B to provide a two-rail output signal $f_1$ and $f_2$. In cases of failure all in the same directions in either FA′ or FB′, the output of that network will be N, i.e., either (1, 1) or (0, 0). If one of the other copies has a correct output signal, then restoration network RS1 will correct the failure and the double-line or double-rail output signal $f_1$, $f_2$ will be correct. The restorer produces output signals according to the combinations shown below:

| $fa_1, fa_2$ | $fb_1, fb_2$ | OUTPUT (RS1) |
|---|---|---|
| R | R | R |
| N | R | R |
| R | N | R |
| N | N | N |
| N | W | W |
| W | N | W |
| W | W | W |
| R | W | N |
| W | R | N |

In the above table, the first two columns show the type output signals of the two copies FA′ and FB′ and the "output" column lists the restorer's type output signals. N denotes a safe type output, either (0, 0) or (1, 1), R the correct output, and W the incorrect output (neither correct nor N).

The following map illustrates the specific assignment used for and the functions of restorer RS1:

| $fb_1fb_2$ \ $fa_1fa_2$ | 00 | 01 | 11 | 10 |
|---|---|---|---|---|
| 00 | 11 | 01 | 00 | 10 |
| 01 | 01 | 01 | 01 | 00 |

-Continued

| | | | | |
|---|---|---|---|---|
| 11 | 00 | 01 | 11 | 10 |
| 10 | 10 | 00 | 10 | 10 |

For explanation, the (0, 0) or (1, 1) entries in the above map are replaced by N, indicating a safe output type signal in the following equivalent map:

| | $fa_1fa_2$ | | | |
|---|---|---|---|---|
| $fb_1fb_2$ | 00 | 01 | 11 | 10 |
| 00 | N | 01 | N | 10 |
| 01 | 01 | 01 | 01 | N |
| 11 | N | 01 | N | 10 |
| 10 | 10 | N | 10 | 10 |

From the above demonstrated restorer behavior and the characteristics of the N-fail-safe logic, it is clear that so long as the failures are all in one direction and remain confined to one copy, the correct output will be assured at the output of the restorer.

It will be noted that, unlike other redundancy schemes, the system described here has two levels of failure: (1) restoration failure (when the output is not correct but has a safe or N type output), and (2) catastrophic failure (when the output is neither correct nor N). Assuming that each N-fail-safe primitive has at most two gates (each AND, NAND, OR, and NOR primitive has two gates, but the NOT primitive has no gate), then if a Boolean function needs n gates in its realization, the realization of its N-fail-safe version will need at most 2n gates. In the following, the failure probability formulas are derived for the two-copy system of FIG. 3 based on this assumption:

Let $p = s + t$ be the failure probability of a gate, where s and t denote the probability of "stuck-at-0" and the "stuck-at-1" failures respectively. The system can fail to correct faults in two different ways: (1) one or more gate in each copy fails in the same direction (all stick to 0 or all stick to 1), and as a result both the copies give safe output N, which is passed onto the final output by the restorer, and (2) two (or more) gates fail in opposite directions in one of the copies, giving rise to an unsafe value at the output of that copy. In the latter case, even if the other copy is working correctly, the restorer output will be N.

The probability of case 1 can be approximated by that of the two gates failing in two separate copies, and is given by (the product $np$ is small in practice, usually << 1):

$$Q_1 = [2np(1-p)^{2n-1}]^2 \approx 4n^2p^2$$

(the probability of N output in a copy is $2np$.)

The probability of case 2 can be approximated by that of two gates failing in opposite directions in a copy, which is:

$$Q_2 = 2(2^{2n})2st(1-p)^{2n-2} \approx 8n^2st$$

The maximum value of $st$ is $p^2/4$. Thus $$Q_2 \approx 8n^2p^2/4 = 2n^2p^2$$

(Thus the probability of W output in a copy is $n^2p^2$.)

The overall restoration failure probability is thus given by $$Q = Q_1 + Q_2 = 4n^2p^2 + 2n^2p^2 = 6n^2p^2 \quad (1)$$

A catastrophic failure will occur if, because of some faults, one of the copies gives an incorrect value while the other copy has a safe value $N$. The case when both copies have incorrect output can be ignored as that probability is negligible. If it is assumed that any two gates failing in different directions in one copy give rise to an incorrect output, while a single gate failure in another copy gives rise to $N$ at its output, then the catastrophic-failure probability is:

$$Q_3 = 2\,(2np)\,(2^{2n})\,(2st)\,(1-p)^{2n-2}(1-p)^{2n-1} \approx (4np)\,(4n^2)\,(p^2/4) = 4n^3p^3 \quad (2)$$

These are the worst case failure probabilities because the aforementioned assumption may not result in these faults and because it has been assumed that each N-fail-safe primitive has two gates, which actually is not the case for the NOT primitive. Moreover, the actual value of st will be far less than $p^2/4$ if asymmetrical elements (i.e., those with $s \neq t$) are used. When ideal asymmetrical elements are used, $$Q = Q_1 = 4n^2p^2, \text{ and } Q_3 = 0$$

Detailed comparison between the system of this invention and other popular redundancy schemes are given in Das and Chuang, "Fault-Tolerant Digital System — A New Approach and Comparative Study," Tech. Memorandum No. 161, Computer Systems Laboratory, Washington University, July, 1972.

A system of this invention using multiple copies of N-fail-safe logic has been discussed above and a specific embodiment using two logic network copies has been described (FIG. 3). Further extensions and embodiments will now be described. As stated above, the fault-tolerant system of this invention is very flexible and one can use as many copies as he needs, make up a table of combinations as was done in the third table shown above, and fabricate a restorer in accordance therewith as exemplified by FIG. 3. In view of the foregoing, a restorer which would operate in accordance with the logic of such a table can be constructed by one skilled in the art.

Figure 4:
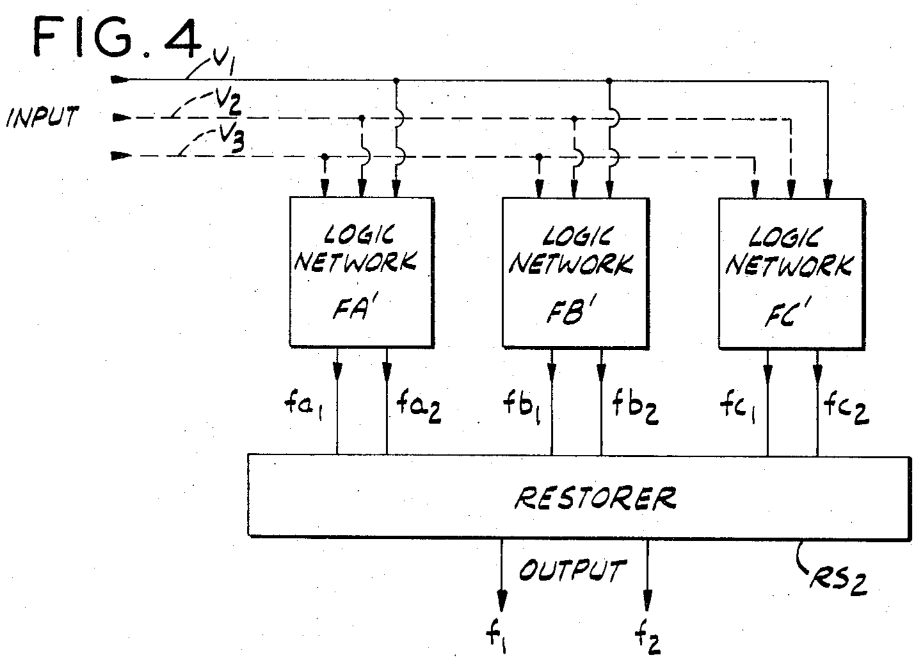
FIG. 4 is a block diagram of a fault restoration system using three copies of N-fail-safe logic networks.

To further describe the system of this invention, a three-copy system employing three copies of N-fail-safe logic is now considered. Since an odd number of logic network copies are to be used, it is possible to incorporate in this system all the inherent merits of both majority voting the N-fail-safe logic. Such a further system is shown in FIG. 4.

Figure 5:
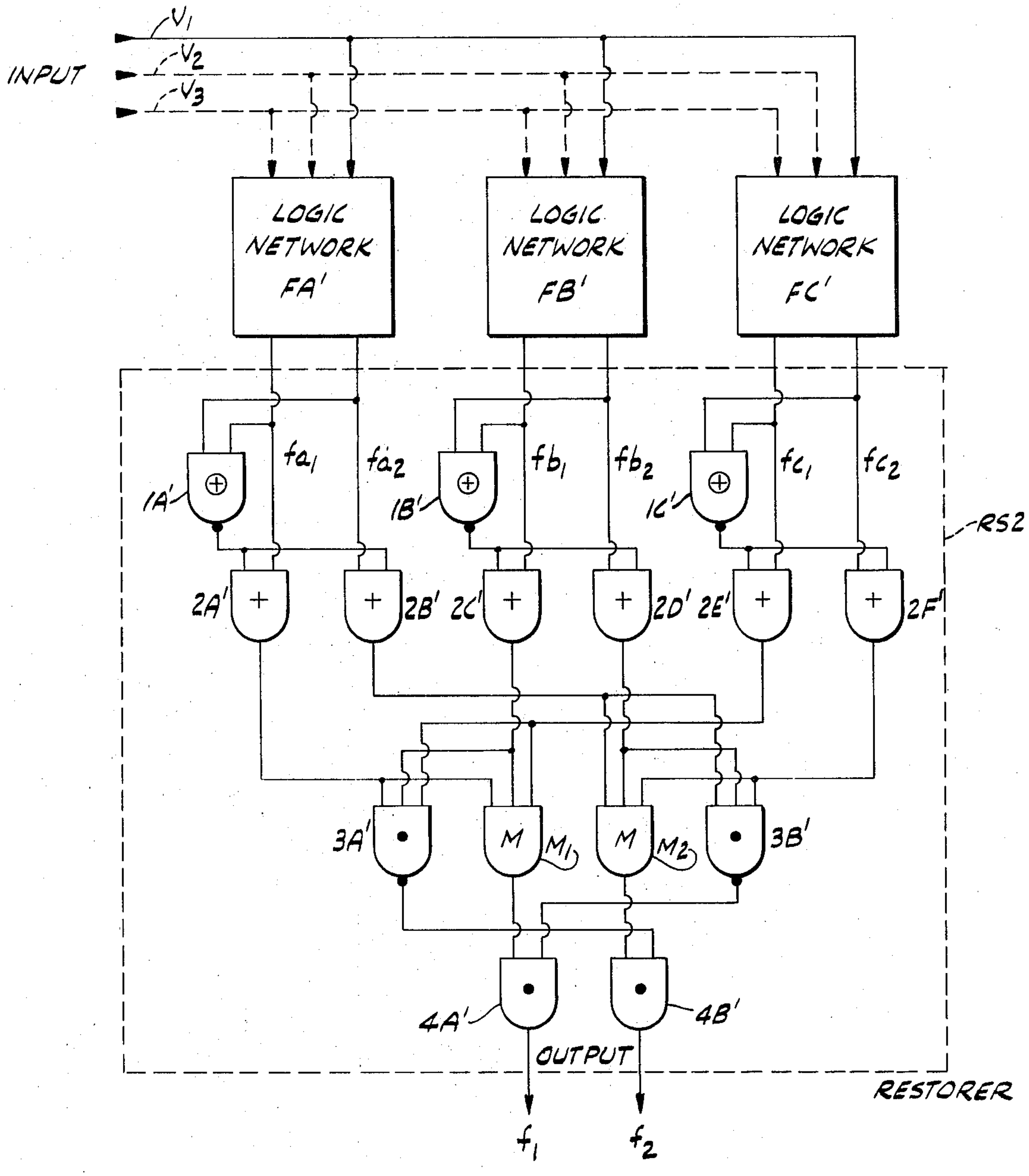
FIG. 5 is a logic diagram of the fault restoration system of FIG. 4.

The logic diagram of FIG. 5 shows an exemplary restorer circuit RS2 which produces the system output as shown in the following table:

| FA' | FB' | FC' | OUTPUT RS2 | No. of Combinations | Approximate Probability |
|---|---|---|---|---|---|
| N | N | R | R | 3 | $3(2np)^2 = 12n^2p^2$ |
| N | R | R | R | 3 | $3(2np) = 6np$ |
| R | R | R | R | 1 | $(1-np)^3 \approx 1$ |
| W | R | R | R | 3 | $3n^2p^2$ |

-Continued

| FA' | FB' | FC' | OUTPUT RS2 | No. of Combinations | Approximate Probability |
|---|---|---|---|---|---|
| N | N | N | N | 1 | $(2np)^3=8n^3p^3$ |
| W | N | R | N | 6 | $6\times 2npxn^2p^2=12n^3p^3$ |
| W | W | N | W | 3 | $3\times(n^2p^2)^2(2np)=6n^5p^5$ |
| W | N | N | W | 3 | $3\times(n^2p^2)(2np)^2=12n^4p^4$ |
| W | W | W | W | 1 | $(n^2p^2)^3=n^6p^6$ |
| W | W | R | W | 3 | $3\times(n^2p^2)^2=3n^4p^4$ |

The columns FA', FB' and FC' list the outputs of the three respective copies, and the "output" column gives the output of restorer RS2. "No. of Combinations" means the number of ways copies FA', FB' and FC' can have the particular set of outputs. Again, N denotes either (0, 0) or (1, 1), either of which is a safe (S) type of output signal, R the correct output, and W the incorrect one. In this three-copy system, gates 1A' through 1C' are exclusive NOR gates; 2A' through 2F' are OR gates; gates 3A' and 3B' are NAND; gates 4A' and 4B' are AND gates; while gates M1 and M2 are Majority gates.

The "Approximate Probability" column shows, in each row, the probability of having the particular set of outputs (based on the assumption that two gates per primitive are used for the realization).

$2np$ is the approximate probability for one copy to produce the N output, while $n^2p^2$ is the approximate probability of producing the W output. The sum of all the probabilities in W-output rows gives the catastrophic (incorrect output) failure probability, while the sum of those in the W-output and N-output rows gives the restoration failure probability. Thus, for this three-copy system of FIG. 5:

Catastrophic failure probability $$\approx 3n^4p^4 + 12n^4p^4 + 6n^5p^5 + n^6p^6$$
$$= 15n^4p^4 + 6n^5p^5 + n^6p^6$$
$$\approx 15n^4p^4 \qquad (3)$$

Restoration failure probability $$\approx 8n^3p^3 + 12n^3p^3 + 15n^4p^4 + 6n^5p^5 + n^6p^6$$
$$= 20n^3p^3 + 15n^4p^4 + 6n^5p^5 + n^6p^6$$
$$\approx 20n^3p^3 \qquad (4)$$

As mentioned above, the restoration strategy may be extended to systems using any number of copies and, given the particular desired reliability requirements, a computer program can then be written to determine how many copies would be required.

Figure 6:
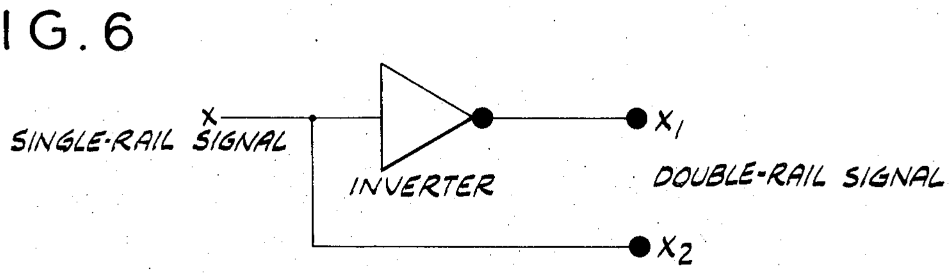
FIG. 6 is a logic diagram showing a simple fail-safe interface for converting a single-rail signal to a double-rail signal.
Figures 7, 8:
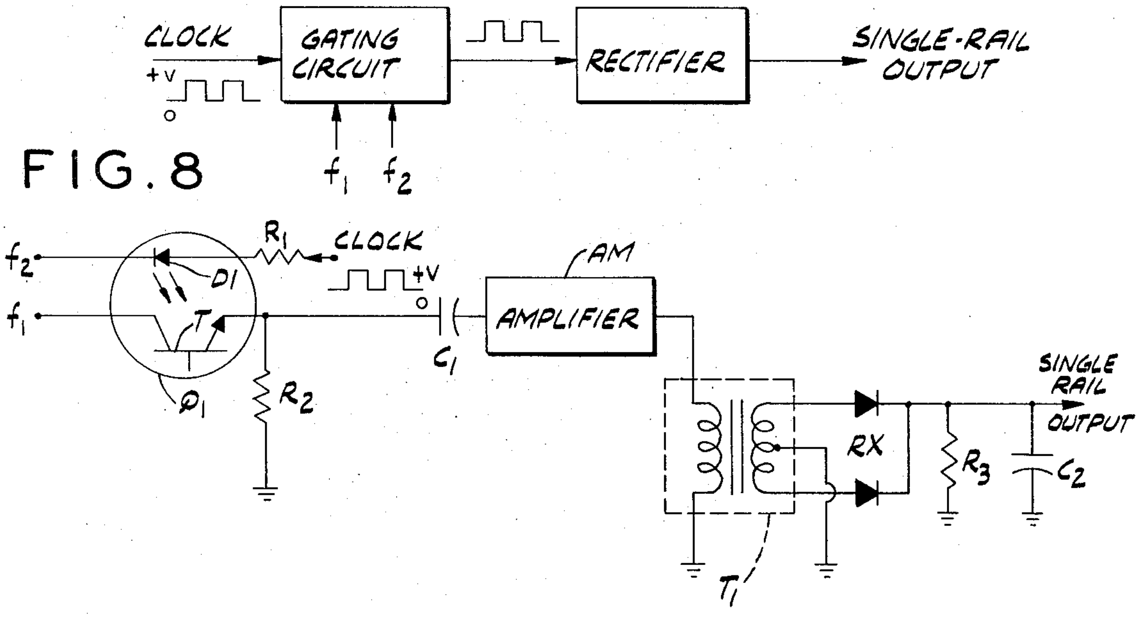
FIG. 7 is a block diagram illustrating a fail-safe interface for converting a double-rail N-fail-safe signal to a single-rail fail-safe signal.
FIG. 8 is a circuit diagram of the FIG. 7 converter interface.

Both single-rail and double-rail logic systems have been discussed. Where double-rail N-fail-safe logic is used (e.g., FIGS. 3–5), it may be desirable or necessary to interface the double-rail logic with single-rail logic, for example, where the output is to be used in a control function. FIG. 6 shows a simple interface for converting a single-rail signal to a double-rail signal. FIG. 7 is a block diagram of an interface made in accordance with this invention for converting a double-rail signal to single-rail. The double-rail N-fail-safe signal ($f_1$, $f_2$) gates a high-frequency clock to the input of the rectifier. The clock frequency is substantially higher than the frequency at which the N-fail-safe logic is operating. The gating circuit provides an a.c. output only when $f_1 = 1$ and $f_2 = 0$. This interface is shown in more detail in FIG. 8. An optically coupled isolator (OCI), indicated at Q1, is used for gating the clock. The clock or other high-frequency generator is coupled via a resistor R1 to a lightemitting diode D1, the other terminal thereof having one of the double-rail signals, $f_2$, applied thereto. Diode D1 constitutes a radiation source which is energized in response to signal element $f_2$ being 0 and the enerator or clock pulse. A light-sensitive solid-state switching device such as transistor T provides or generates an a.c. signal across a load resistor R2 in response to concurrent impingement of radiation thereon and double-rail signal element $f_1$ being 1. Thus, making logic 0 correspond to 0 volts and logic 1 correspond to +V volts, the clock will be gated to the output of the OCI only when $f_1 = 1$ and $f_2 = 0$. The a.c. output of T is coupled via a capacitor C1 to an amplifier AM whose output in turn is applied to the primary of a transformer T1 supplying a rectifier RX, the amplifier and transformer providing electrical isolation between the gating circuit and the single-rail output. Thus a positive d.c. voltage constituting the single-rail logic 1 appears at the rectifier output only when $f_1 = 1$ and $f_2 = 0$. This converter apparatus is fail-safe for any combination of component failures excepting an internal "short" between the "clock" line and the transistor emitter within the OCI and a "short" between the primary and secondary of the transformer. An internal "short" within the transformer can be prevented by putting a "solid" ground between the two windings, and the "short" within the OCI can be ruled out because the device is designed to have high isolation. It should be noted that such an interface is not necessary, particularly if double-rail N-fail-safe logic is utilized throughout. However, if large-scale integration is used, the increase in cost for N-fail-safe logic would be minimal. Moreover, cost increase is frequently justifiable because of the increased protection against failure the use of N-fail-safe logic provides.

It has been shown above that the use of two or more copies of N-fail-safe logic along with restorer means provides a system with two levels of reliability. The catastrophic failure (when output is neither correct nor safe) probability of this system is very low, and using only a few copies one would usually be able to meet stringent reliability criteria. It is to be again noted that the use of N-fail-safe logic is only one exemplary means for fabricating a system of this invention. Any logic circuit having a failure mode similar to that of the N-fail-safe logic would serve in the practice of the invention. An alternative is the use of C-type logic circuits first discussed by Mudaidono ("On the Mathematical Structure of C-type Fail-Safe Logic," *Electronics and Communication in Japan*, Vol. 52–C, No. 12, 1969), although it might be less practical considering the present state of the art of electronics. Thus the logic blocks in FIG. 1 may be other than N-fail-safe logic, provided they have a failed output value disjoint from normal operating values. Further it is to be noted that even if N-fail-safe logic is used it is not necessary to fabricate it by using N-fail-safe primitives. It has been shown by Watanabe and Urano, noted above, that it is also possible to have direct realization of N-fail-safe logic, and thus not employ N-fail-safe primitives.

In accordance with this invention a tradeoff may be effected between restoration failure probability and catastrophic failure probability by altering the restorer logic or the restoration strategy, keeping the number of copies of logic the same. This is demonstrated by the system shown in FIG. 9 where again three copies of N-fail-safe logic, NFA, NFB and NFC have been used, but with surprisingly different results. The following table shows the behavior of the restorer network (constituted by three identical two-copy restorers RS1) along with the probabilities for various possible output combinations of the three copies:

| NFA | NFB | NFC | Restorer Output | No. of Combinations | Approximate Probability |
|---|---|---|---|---|---|
| N | N | R | R | 3 | $3(2np)^2=12n^2p^2$ |
| N | R | R | R | 3 | $3(2np)=6np$ |
| R | R | R | R | 1 | $(1-np)^3\cong 1$ |
| W | R | R | R | 3 | $3n^2p^2$ |
| N | N | N | N | 1 | $(2np)^3=8n^3p^3$ |
| W | N | R | W | 1 | $2np \times n^2p^2=2n^3p^3$ |
| W | R | N | N | 1 | $2np \times n^2p^2=2n^3p^3$ |
| N | W | R | W | 1 | $2np \times n^2p^2=2n^3p^3$ |
| R | W | N | N | 1 | $2np \times n^2p^2=2n^3p^3$ |
| N | R | W | R | 1 | $2np \times n^2p^2=2n^3p^3$ |
| R | N | W | R | 1 | $2np \times n^2p^2=2n^3p^3$ |
| W | W | N | W | 3 | $3\times(n^2p^2)^2(2np)=6n^5p^5$ |
| W | N | N | W | 3 | $3\times(n^2p^2)(2np)^2=12n^4p^4$ |
| W | W | W | W | 1 | $(n^2p^2)^3=n^6p^6$ |
| W | W | R | W | 3 | $3\times(n^2p^2)^2=3n^4p^4$ |

From this table, restoration failure probability = $16 n^3p^3 + 12n^4p^4 + ---$, and catastrophic failure probability = $4n^3p^3 + 12n^4p^4 + ----$. Comparing these failure probabilities with those of the former three-copy system, i.e., Formulas 3 and 4, it is to be noted that the restoration failure probability has been lowered at the cost of increasing the catastrophic failure probability. This kind of trade-off is always possible in the fault-restoration system of this invention.

Figure 9:
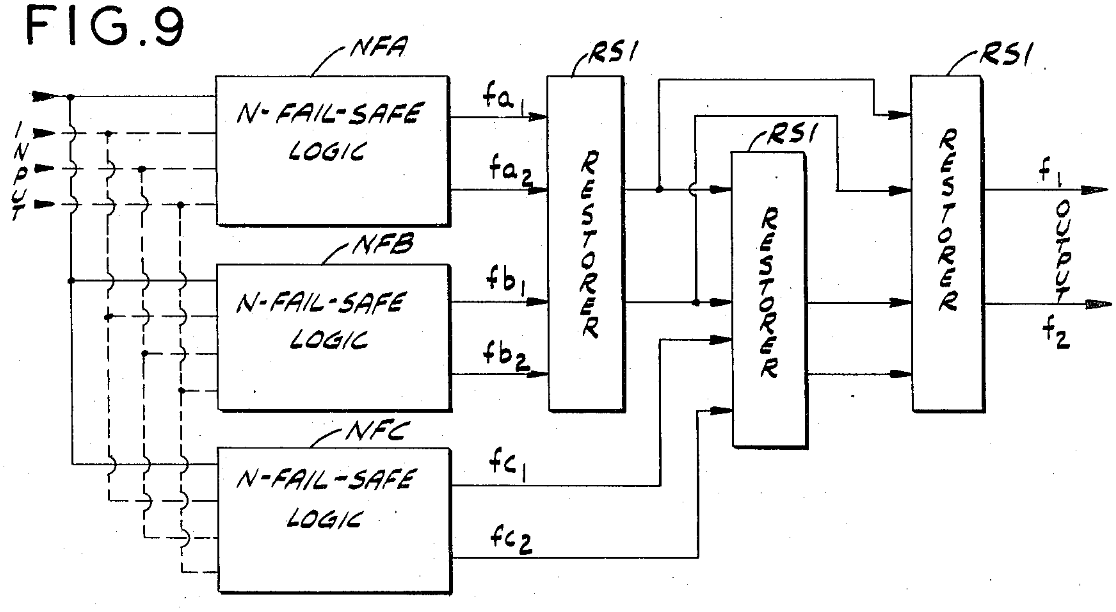
FIG. 9 is a block diagram of an alternative fault restoration system using three copies of N-fail-safe logic networks.

Of course, these are various ways in which a restorer with given behavior may be realized. The restorer network of FIG. 9 is only one way to realize a restorer with behavior as shown in the above table. For instance, a single restorer may be realized (as described in regard to FIG. 5) to effect restoration instead of a network of three two-copy restorers.

The fault-restoration system of this invention is superior in performance to most of the existing redundancy schemes. Quantitative comparisons of the reliability of the system of this invention with those of the others are given in Das and Chuang, supra, and Das and Chuang ("Fault-Restoration Using N Fail Safe Logic," *Proc. of IEEE*, Vol. 60, No. 3, pp. 334–335, Mar., 1972).

It has been found that most of the electronic components, especially the semiconductors, exhibit asymetrical failure characteristics. As a result, $s \neq t$ in general and this means $st << p^2/4$. Thus the failure probabilities calculated for the present system are the worst case estimates. Moreover, any number of unidirectional failures can never drive the system of this invention to failure — a feature not to be found in any other existing redundancy system. Of course, it is an important assumption that the restorer does not fail, i.e., the restorer is really a "hard-core" element. This is a valid assumption because the reliability of the restorer can be improved by using any of the existing redundancy methods or using more reliable components. It is also interesting to note that the restorers shown in FIGS. 3 and 5 are "fail-safe" in the same that no single failure in the restorer would result in an "unsafe" output. In a case where the restorer reliability is in question, one can adopt a multirestorer fault-tolerant system (similar to multivoter principle of Von Neuman) as shown in FIG. 10.

Figure 10:
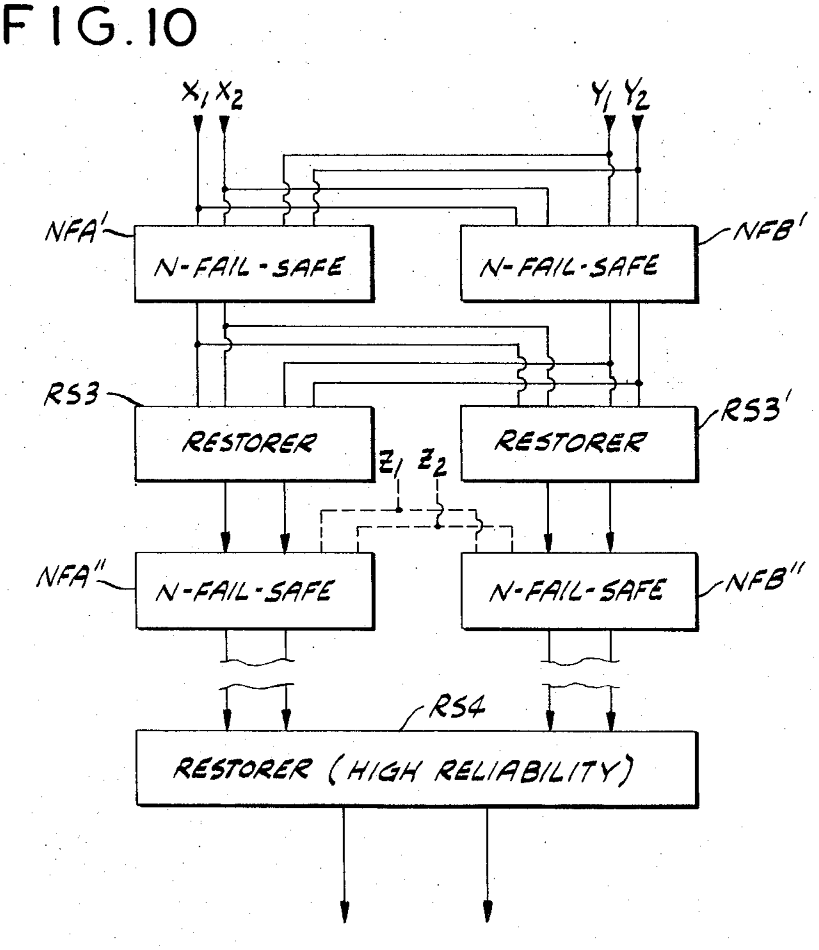
FIG. 10 is a block diagram of another improved reliability system of this invention using a chain of N-fail-safe logic networks along with restorers and terminated with a single high reliability restorer.

In FIG. 10 restorer reliability is enhanced by providing restorer redundancy and providing a pair of restorers RS3, RS3' at a level intermediate two levels of logic networks NFA', NFB' and NFA'', NFB'', the latter of which may have further input variables $z_1$, $z_2$. In addition to using this chain or cascade of logic networks and restorer means to further improve system reliability, a restorer RS4 of extra high reliability is provided. It will be noted that a longer cascade may be provided as indicated by the interrupted lines between the outputs of networks NFA'' and NFB'' and the inputs of restorer RS4. Also, further reliability variations can be provided, particularly where the system has a highly complex logic network, by segregating the network into a number of logic network subsections and interconnecting restorer means either between each level of logic networks or subsections thereof or between each two sequential layers or levels of logic networks, terminating after the desired number of levels with a restorer of extra high reliability, preferably. Also, instead of using two identical copies of logic networks one may, of course, use three or more.

One of the more important advantages of the increased reliability system of this invention is its degradability, which is unmatched by any other existing redundancy method. For example, switching from triplex system (using three copies) to a duplex system is very easy as the logic may be fabricated in such a way that merely shutting off the power of one of the copies forces its output to N or a safe output. Similarly, switching from duplex to simplex, or for that matter from any number of copies to any smaller number of copies, is possible without changing the restorer. This is demonstrated by noting that the fourth table above logically covers the third table. Among all other redundancy schemes, TMR (or NMR) is the only one that is degradable. But even for TMR (or NMR) this sort of degradability is absent as it cannot switch from triplex to duplex, although it can switch to simplex from triplex. To do even that, the majority element has to be bypassed and this is unwieldy. More specifically, if in any system of this invention using two or more copies, one copy fails so as to cause it to have a safe type output signal, the system will still continue to operate and provide correct restorer output signals, but with one fewer copies, and without having to cut out the restorer or the bad copy or switch in a spare copy or restorer. Even if only two copies remain active the restorer output will be correct when one copy has failed so as to provide a safe output. Further failure of the failed copy to a catastrophic level will still not provide an incorrect output signal at the restorer output but will give a safe signal.

Figure 11:
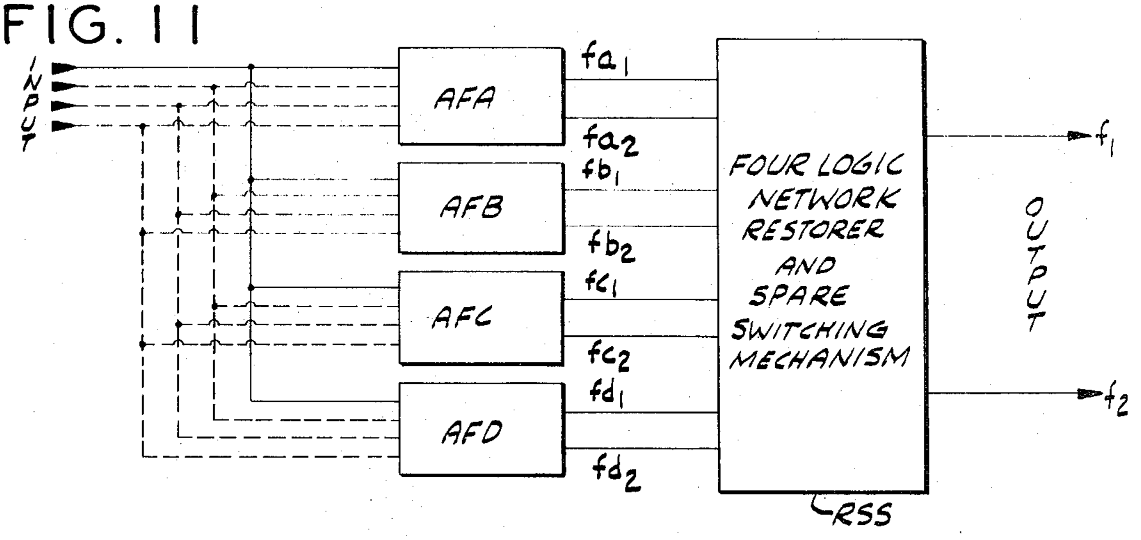
FIG. 11 is a block diagram of a hybrid redundancy fault restoration system of this invention providing switching of spare logic networks.
Figure 12:
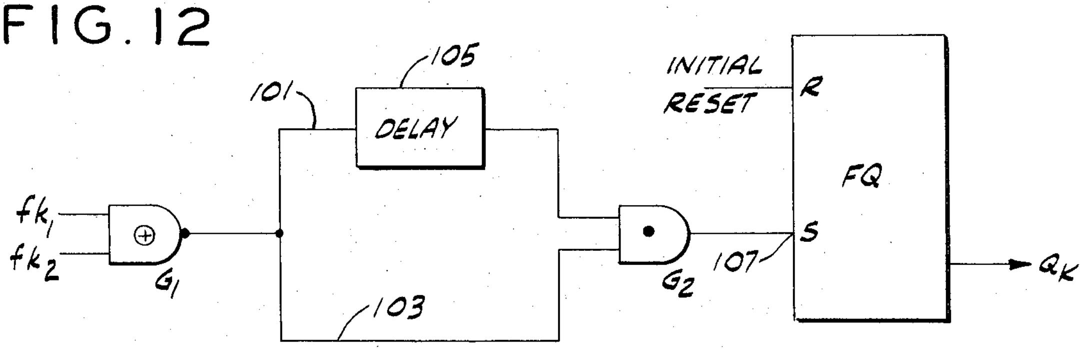
FIG. 12 is a logic diagram of means utilized in the system of FIG. 11 for detecting an active logic network that has failed-safe.
Figure 13:
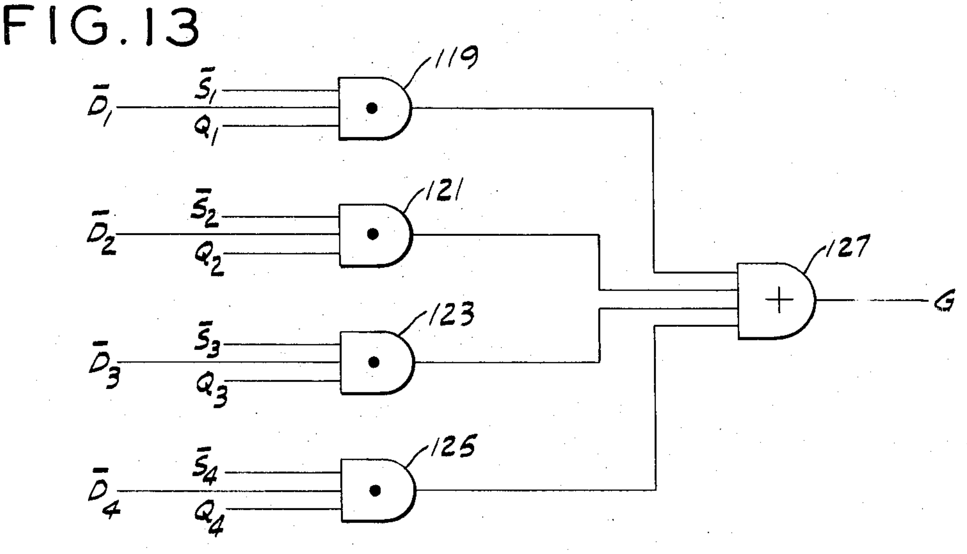
FIG. 13 is a logic diagram of means which is utilized in initiating the activation of a spare in the system of FIG. 11.
Figure 14:
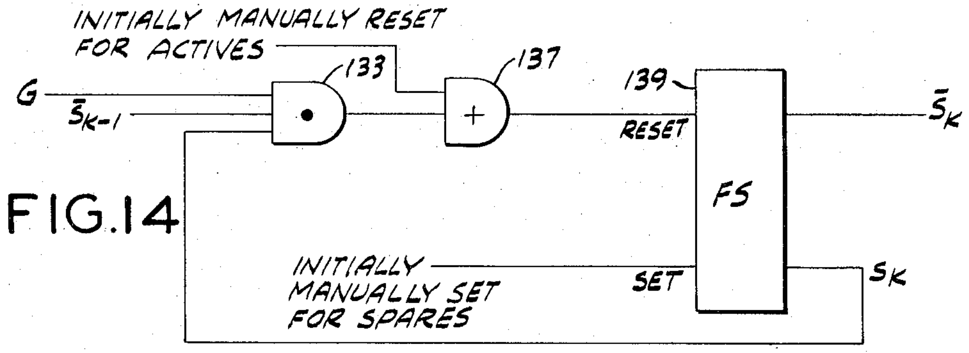
FIG. 14 is a logic diagram illustrating means used in the FIG. 11 system to establish the state of each particular logic network as either being an active or a spare logic network.
Figure 15:
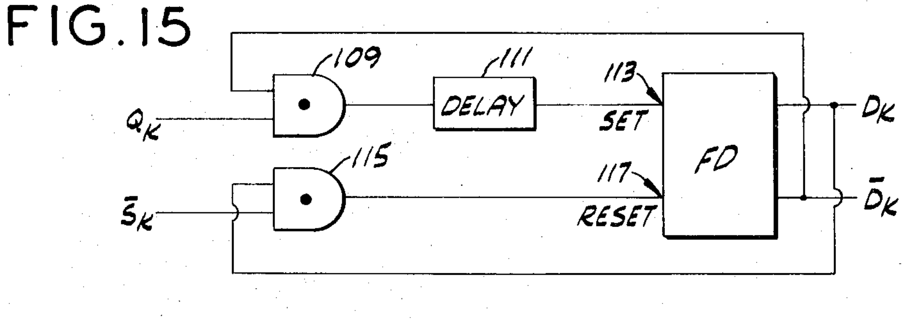
FIG. 15 is a logic diagram illustrating means employed in the system of FIG. 11 for initiating the switching out of a failed-safe network and the switching in of a spare.
Figure 16:
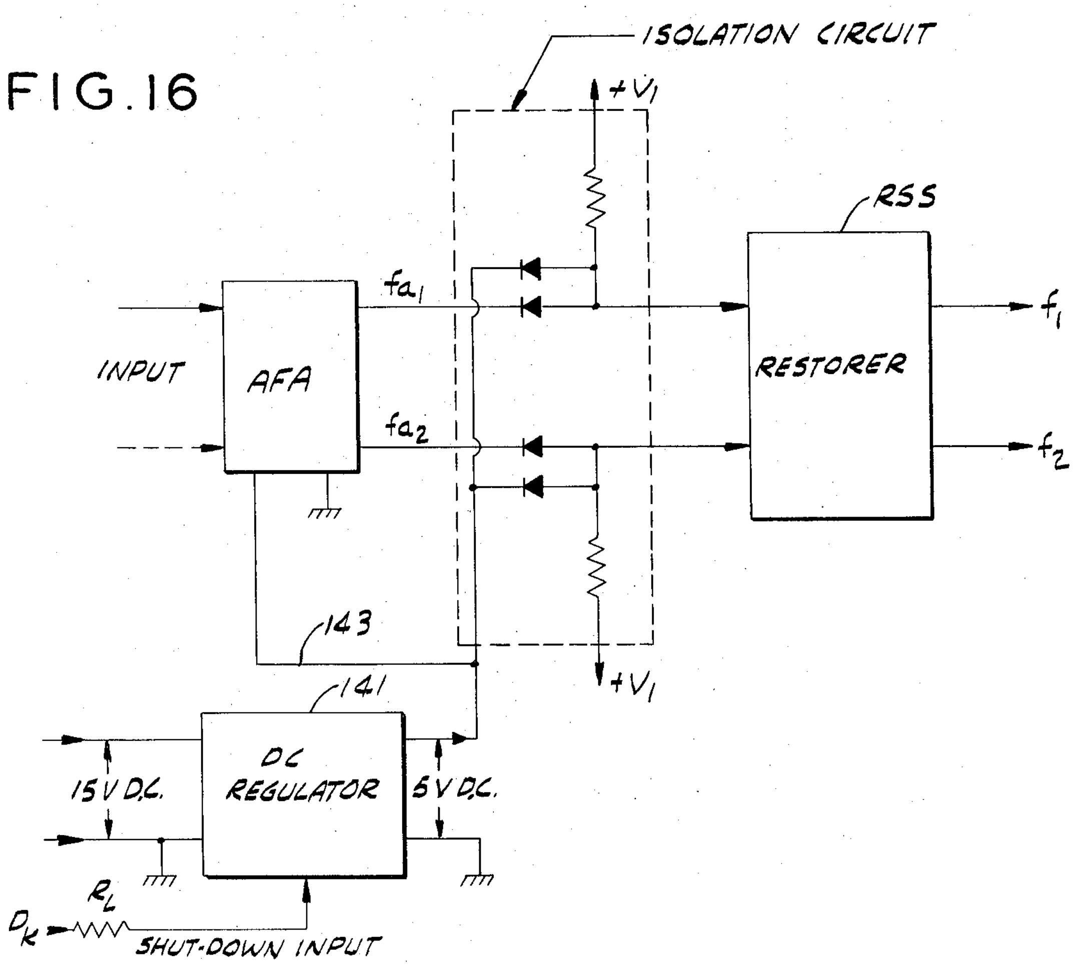
FIG. 16 is a circuit diagram illustrating means for switching in and out of logic networks of the system of FIG. 11.

FIGS. 11–16 illustrate a hybrid redundancy fault-restoration system providing switching of spare networks. This system includes four identical logic networks, AFA, AFB, AFC and AFD, two of which are initially connected and employed in an active mode and two of which are initially employed in a spare mode; and a four-logic network restorer RSS which includes a portion (FIG. 13) of the spare switching mechanism all as indicated in FIG. 11. Each logic copy includes means for detecting whether the logic network, if active, has failed safe (FIG. 12); means for establishing the state of the logic network as either being an active or a spare logic network (FIG. 14); means used for initiating the switching out of an active logic network upon its failure to a safe state and the activating of a spare (FIG. 15); and means for switching the logic network into and out of the system (FIG. 16). The system further includes means utilized in initiating the activation of a spare logic network (FIG. 13).

Each identical logic network shown in FIG. 11 includes three flip-flops: a flip-flop FQ (FIG. 12), a flip-flop FS (FIG. 14), and a flip-flop FD (FIG. 15). The FQ flip-flop of an active logic network is initially in a reset condition ($Q_k$ is 0). The FS flip-flop of an active logic network is initially in a reset condition ($S_k$ is 0, $\bar{S}_k = 1$) while the FS flip-flop of a spare logic network is initially in a set condition ($S_k = 1$, $\bar{S}_k = 0$).

A given double-rail logic network produces a signal ($fk_1$, $fk_2$) which goes to an exclusive NOR gate $G_1$ as shown in FIG. 12. The output of $G_1$ is connected through parallel paths 101 and 103 to an AND gate $G_2$. Path 101 includes a delay network 105 which has a dual function: first, to ignore hazardous pulses (which are not due to circuit failures) and second, to ignore transients or intermittent failures which could be a result of noise. $G_2$ is connected to a set terminal 107 of flip-flop FQ which has an output signal $Q_k$. Assuming this logic network to be active, $Q_k$ is 0. It is to be noted that a 1 signal will propagate to 107 changing the flip-flop to a set state ($Q_k$ becomes 1) only if an N-fail-safe signal ($fk_1, fk_2 = 0, 0$ or $1, 1$) appears at gate $G_1$.

An analysis of FIG. 15 is required to determine the initial state of the FD flip-flop of an active logic network. The $\bar{D}_k$ output of flip-flop is connected to an AND gate 109. The other input to gate 109 is the $Q_k$ output of flip-flop FQ. Gate 109 is connected to set input 113 of flip-flop FD through a delay network 111. Output $D_k$ of flip-flop FD is connected to an AND gate 115. The other input of gate 115 is the $\bar{S}_k$ output of flip-flop FS. The output of gate 115 is connected to the reset input 117 of flip-flop FD. Flip-flop FD must be either in a set or reset state. $\bar{S}_k$ for an active logic network has been set at 1. Since $Q_k$ for an active logic network has been set at 0, it is impossible for the set input 113 of FD to be energized and therefore initially FD must be in a reset state ($D_k$ is 0, $\bar{D}_k = 1$).

As shown in FIG. 13, the $\bar{S}$, $\bar{D}$ and $Q$ outputs of the FS, FD and FQ flip-flops in each of the four logic networks are connected to AND gates 119, 121, 123 and 125, each respectively representing networks AFA, AFB, AFC and AFD. The outputs of these AND gates are connected to an OR gate 127 having an output G. Assuming logic network AFA (FIG. 11) is initially made active, then initially $\bar{S}_1$ is 1, $\bar{D}_1$ is 1, and $Q_1$ is 0 so the output of gate 119 is 0. Assuming logic network AFA fails and thereby produces an N-fail-safe output signal, $Q_1$ then becomes 1; the output of gate 119 becomes 1; the output of 127, G, also becomes 1. When G changes from 0 to 1 it initiates the switching out of a failed-safe logic network, AFA, and the switching in of a spare, AFC (FIG. 11), as described in further detail below.

FIG. 14 illustrates means by which the initially spare logic network AFC becomes activated. The FIG. 14 circuitry includes an AND gate 133 with three inputs $S_k$, $\bar{S}_{k-1}$ and $G$. $S_k$ was set at 1 since logic network AFC is initially in the spare mode, while $\bar{S}_{k-1}$ is 1 because the logic network AFB (see FIG. 11) is active and immediately precedes logic network AFC. The output of gate 133 is connected to an OR gate 137, the output of which is connected to a reset terminal 139 of the FS flip-flop. When the gate 133 functions, gate 137 functions, and the FS flip-flop assumes the reset state thereby activating logic network AFC via FD (FIG. 15).

Referring to FIG. 15, flip-flop FD will have a $\bar{D}_k$ of 1 when the particular logic network it represents is active. When such logic network, e.g., AFA, has an output which becomes N, $Q_k$ becomes 1 and changes the state of flip-flop FD so that $D_k$ becomes 1.

When $D_k$ becomes 1, a d.c. regulator 141 (FIG. 16) shuts down or removes the voltage supply via a line 143 to AFA. This forces the AFA output signal ($fa_1$, $fa_2$) permanently to 0, 0, an N or safe output. For the network AFC, $D_k$ becomes 0 and switches on its power.

Figure 18:
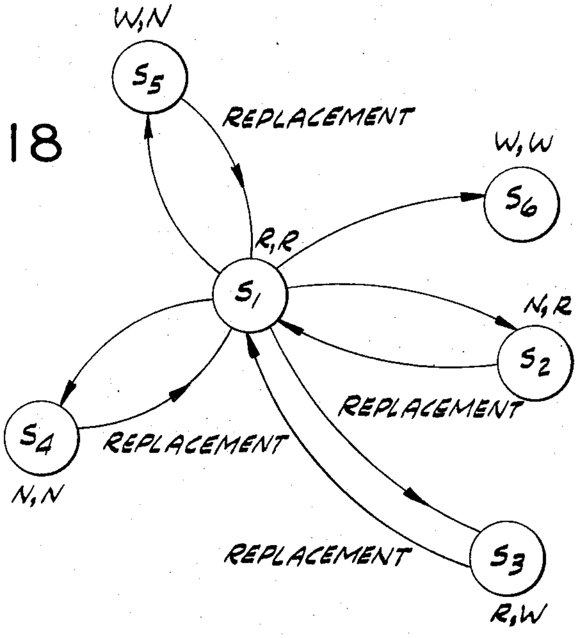
FIG. 18 is an illustration depicting the various failure states of a two-active-copy fault-restoration system of this invention and the effect of replacement.

The system of FIGS. 11–16 is particularly useful where a very high mission-life is to be achieved. The different possible failure states of the two active networks are illustrated in the diagram of FIG. 18 wherein it is assumed that two networks can both fail concurrently and the failure may result in incorrect outputs. From all states other than $s_6$, it is possible to recover. If the assumption is made that the cold spares do not fail, a replacement strategy can be planned very easily.

Figure 17:
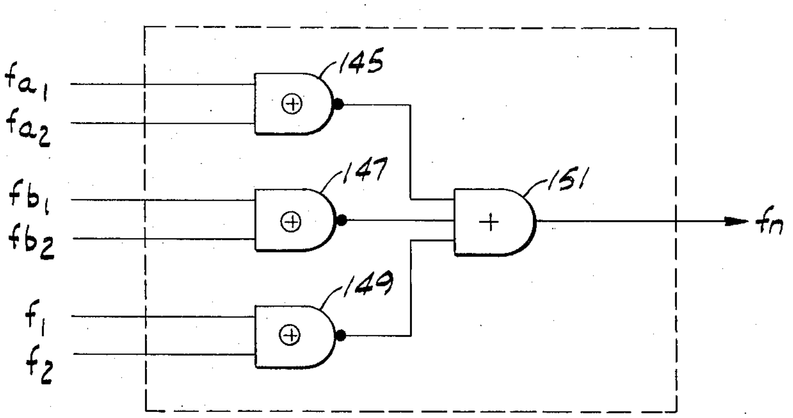
FIG. 17 is a logic diagram illustrating means for detecting an N output from either of the copies or the restorer in the system of FIG. 11.

Another N-detector, differing somewhat from that shown in FIG. 12, is illustrated in FIG. 17. The FIG. 17 detector has three exclusive NOR gates 145, 147 and 149 each having its respective inputs connected to identical logic network outputs $fa_1, fa_2$; $fb_1, fb_2$; and to restorer output $f_1$ and $f_2$. An OR gate 151 has its inputs connected to the outputs of gates 145, 147 and 149. A replacement strategy utilizing the N-detector can be planned as follows: For example, when $fn = 1$ but neither the output of the gate 145 nor that of 147 is 1, it is apparent that the system is in state $s_3$. To recover, one of the copies is replaced at random. If $fn$ remains 1, it indicates that a good copy has been replaced. Similarly, when the outputs of both gates 145 and 147 are 1, we know we are in state $s_4$ and we have to replace both copies. If $fn = 1$ and only one of the gates 145 or 147 is 1, then we are either in $s_2$ or $s_5$. To recover from $s_2$, the copy which has an N output is replaced. To get out of state $s_5$, the copy with N output is first replaced. Since the other copy has an output W, the $fn$ output would still be 1, indicating that the other copy has also got to be replaced. Thus, excepting state $s_6$, recovery can easily be made from any other state.

Since in the N-fail-safe logic networks employed in many of the embodiments described herein the component functions $f_1$ and $f_2$ are inherently monotonic, it will be very easy to use MOS/MSI techniques in a system made in accordance with the present invention. It has been shown by Spencer ("MOS Complex Gates in Digital Systems Design," *Computer Group News*, Vol. 2, No. 11, Sept., 1969, pages 46–56) that, if there are two functions with the same number of variables, one monotonic and the other non-monotonic, the complexity of MOS/MSI for the monotonic one is far less than the complexity of MOS/MSI for the non-monotonic function. Thus each copy of a logic network advantageously can be fabricated with two MOS/MSI integrated circuits, one for $f_1$ and one for $f_2$.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

What is claimed is:

1. An increased reliability switching or digital system comprising at least two identical logic networks each of which has an output providing three distinctly different types of output signals, said types of output signals being correct, safe and incorrect, whereby there are two possible levels of failure one being a safe level and the other being an incorrect level; and restorer means having inputs connected to the logic network outputs and having a single output providing three distinctly different types of output signals, the first of which is correct, the second of which is safe, and the third being incorrect, said restorer means providing a correct output signal for so long as more of the logic networks have correct output signals than have incorrect output signals no matter how many networks might have a safe output signal, said restorer means further providing a safe output signal if as many logic networks have a correct output signal as have an incorrect output signal, said restorer means providing an incorrect output signal only if more logic networks have incorrect output signals than have correct output signals.

2. A system as set forth in claim 1 in which said logic networks and said restorer means are N-fail-safe.

3. A system as set forth in claim 1 in which said logic networks and said restorer means have two rail outputs.

4. A system as set forth in claim 1 which further includes means interconnected with the inputs of each logic network for converting single-rail signals to two-rails signals.

5. A system as set forth in claim 3 which further includes means for converting two-rail output signals of said restorer means to single-rail output signals.

6. A system as set forth in claim 3 in which said logic networks and restorer means are fabricated in accordance with MOS/MSI techniques.

7. A system as set forth in claim 2 in which said logic networks and restorer means include components which have asymmetrical failure characteristics.

8. A system as set forth in claim 1 which includes additional restorer means interconnected with the outputs of said logic networks, the outputs of both the first said and additional restorer means being connected to the inputs of respective additional logic networks, and further restorer means having the inputs thereof responsive to the outputs of said additional logic networks, said further restorer means having higher reliability than the first said restorer means whereby the reliability of the system is further improved.

9. A system as set forth in claim 1 wherein said logic networks include means for detecting a safe output signal therefrom.

10. A system as set forth in claim 1 further including means for detecting a safe output signal from the restorer means.

11. A system as set forth in claim 1 further including means for detecting a safe output signal from both logic networks and restorer means.

12. A system as set forth in claim 11 which further includes means responsive to safe output signals both from the logic networks and the restorer means for restoring the system under concurrent failures in more than one logic network.

13. A system as set forth in claim 9 further including means responsive to a safe output signal from any logic network for permanently forcing the output thereof to a safe output signal.

14. A system as set forth in claim 9 which further includes at least one spare logic network and means responsive to a safe output signal from a logic network for deactivating the last said logic network and activating in its stead a spare logic network.

15. Apparatus for converting a double-rail signal to a single-rail signal comprising a high-frequency generator, a radiation source responsive to one element of said double-rail signal thereby to be energized by said high-frequency signal, means responsive to the other element of said double-rail signal and radiation produced by said source for generating an a.c. signal, and means for rectifying said a.c. signal to provide a single-rail signal which corresponds to one of the double-rail signals, said generator having an operating frequency substantially higher than that of said double-rail signal, said radiationresponsive means being nonconductively coupled to said radiation source thereby to provide electrical isolation between said one element and said radiation-responsive means and to effect fail-safe operation of said apparatus.

16. Apparatus as set forth in claim 15 which further includes electrical isolation means between said radiation-responsive means and said rectifier.

17. Apparatus as set forth in claim 16 in which said isolation means includes an amplifier and transformer coupling between said amplifier and said rectifier.

18. Apparatus as set forth in claim 15 in which said radiation source is a light-emitting diode and said radiation-responsive means is a light-sensitive solid-state switching device, said diode and switching device being optically coupled.

19. Apparatus as set forth in claim 15 in which the double-rail input signal is N-fail-safe.

* * * * *